US008689107B2

(12) United States Patent
Dong et al.

(10) Patent No.: US 8,689,107 B2
(45) Date of Patent: Apr. 1, 2014

(54) SYSTEM AND METHOD FOR AGGREGATING MULTI-PROTOCOL FLOWS FOR NETWORK MONITORING

(75) Inventors: Wei Dong, Richardson, TX (US); Sanchu Han, Allen, TX (US); James Eric Wilson, Richardson, TX (US)

(73) Assignee: Tektronix, Inc., Beaverton, OR (US)

( * ) Notice: Subject to any disclaimer, the term of this patent is extended or adjusted under 35 U.S.C. 154(b) by 703 days.

(21) Appl. No.: 12/639,075

(22) Filed: Dec. 16, 2009

(65) Prior Publication Data

US 2011/0145763 A1   Jun. 16, 2011

(51) Int. Cl.
*G06F 15/177*   (2006.01)
(52) U.S. Cl.
USPC ............ 715/736; 715/734; 715/738; 715/853; 715/969
(58) Field of Classification Search
USPC .......................... 715/734, 736, 738, 853, 969
See application file for complete search history.

(56) References Cited

U.S. PATENT DOCUMENTS

| 2003/0101408 | A1* | 5/2003 | Martinian et al. ............ 714/776 |
| 2006/0168207 | A1* | 7/2006 | Choong et al. ................ 709/224 |
| 2008/0049641 | A1* | 2/2008 | Edwards et al. .............. 370/253 |
| 2008/0144656 | A1* | 6/2008 | Frishberg et al. ............. 370/466 |
| 2011/0141923 | A1* | 6/2011 | Young et al. .................. 370/252 |

* cited by examiner

*Primary Examiner* — Shen Shiau
(74) *Attorney, Agent, or Firm* — Edwards Wildman Palmer LLP; Scott D Wofsy; Christopher J. Capelli (57) ABSTRACT

A system and method for aggregating IP flows in a telecommunication network is disclosed. A multi-protocol flow representing packets captured from the telecommunications network during a selected time period is displayed on a user interface of a network monitoring system. The multi-protocol flow is highlighted on the user interface display if any session records within the multi-protocol flow do not meet operator-defined criteria. The user interface detects a user's selection of the multi-protocol flow and displays a plurality of protocol-specific flows that are within the multi-protocol flow. The user interface detects the user's selection of one of the protocol-specific flows and displays a plurality of session flows that are within the selected protocol-specific flow. Any session records that do not meet operator-defined criteria are highlighted on the user interface.

5 Claims, 7 Drawing Sheets

SYSTEM AND METHOD FOR AGGREGATING MULTI-PROTOCOL FLOWS FOR NETWORK MONITORING

TECHNICAL FIELD

Embodiments are directed, in general, to identifying errors in a telecommunications network and, more specifically, to aggregating session flows in a hierarchical manner to allow rapid identification of errors in lower layers of the hierarchy.

BACKGROUND

The number of subscribers using telecommunications networks and the number of services available across such networks has created an enormous volume of data traffic. In 10 Gbps networks and beyond, user plane traffic volume is enormous and presents a challenge for an effective network monitoring system. Network operators need to monitor multiple hops of the same session to troubleshoot the network and to pinpoint which node or link on the network is creating a problem. Even if a network monitoring system can monitor traffic on all legs of the network, the network operator would quickly be overwhelmed by the huge traffic volume. The network monitoring system must be capable of presenting the user plane data to network maintainers so that actionable information is readily available and understandable so that a high level of network availability is maintained.

SUMMARY

Embodiments of the network monitoring system described herein provide a system and network for correlating all packets for each flow on the telecommunications network into a session record representing a selected time interval. The session records are further aggregated by protocol or application type. The aggregated session records are further combined into a multi-protocol representation of the network traffic for the selected time interval.

The network operator defines certain criteria for the operation of the network. The session records are compared to the criteria. If the criteria are violated, then the session record associated with the error is highlighted or flagged. If a session records is highlighted or flagged for an operating criteria violation, then the aggregation of the session records for that protocol is also highlighted or flagged. Finally, the multi-protocol aggregation is also highlighted or flagged if one of the protocol-specific aggregation includes a session with an error.

Embodiments of the invention include multiple levels of aggregation of user plane data, with key performance indicators (KPI) on each level of aggregation, and with a subscriber's network session data. Network operators using the monitoring system can easily browse through a large volume of user data for a specific subscriber, home in specific areas of interest. At the same time, the network monitoring system provides a "drill down" path for the operator to drill to specific network packets of interest to the user.

For user plane protocols such as HTTP, WAP, etc., the network monitoring system tracks the sessions as enhanced flow records using a probing system. By default, all flows are further aggregated into multi-protocol flows. The multi-protocol aggregated flows are then presented on GUI display to the network operator. In the multi-protocol aggregated flows, each protocol will aggregate essential statistics, such as uplink/downlink and packets/bytes for that protocol. Protocols identified as having failures during the aggregation period are highlighted to allow easy-identification of the session error for further investigation. On demand, the operator may select or "click" on a displayed multi-protocol aggregated flow. The displayed flow expands in place into flow records of one or more protocols for the same time period. Clicking on the flow of interest can retrieve the user plane flows across all the network links, enabling hop-by-hop analysis as packets traverse the network. The flow records can be further expanded to display the network packets that are in those flows.

BRIEF DESCRIPTION OF THE DRAWINGS

Having thus described the system and method in general terms, reference will now be made to the accompanying drawings, which are not necessarily drawn to scale, and wherein:

DETAILED DESCRIPTION

Figure 1:
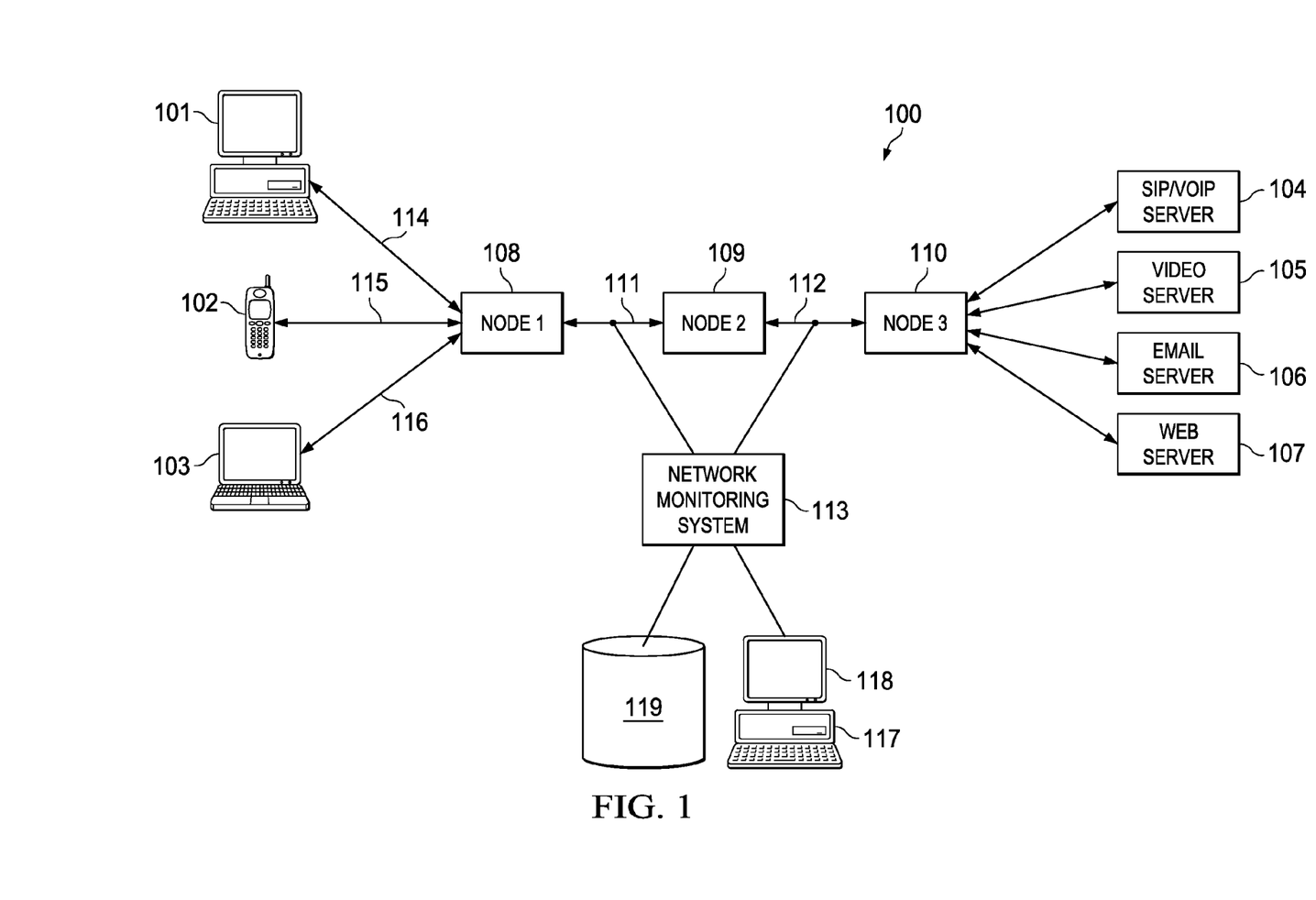
FIG. 1 illustrates an exemplary data network coupled to network monitoring system according to an exemplary embodiment.

FIG. 1 illustrates an exemplary data network in which users at devices 101-103 access data or applications on servers 104-107 via nodes 108-110 across links 111-112. FIG. 1 is a high-level representation of a data network for discussion purposes only and is not intended to limit the inventions disclosed herein to any particular network or protocol. Devices 101-103 may be computers, mobile devices, user equipment (UE), or client applications, for example. Nodes 108-110 and links 111-112 may represent a single service provider's network or may represent components of multiple networks. For example, node 108 may be part of a wireless or cellular network, such as a wireless access point, cellular system base station or node B, and/or part of an internet service provider's (ISP) network, such as a router or modem. Devices 101-103 access node 108 via wireless or wireline connections 114-116. Nodes 109-110 may be components in an intranet, Internet, or public data network, such as a router or gateway. Nodes 109-110 may also be components in a 3G or 4G wireless network, such as a Serving GPRS Support Node (SGSN), Gateway GPRS Support Node (GGSN) or Border Gateway in a General Packet Radio Service (GPRS) network, Packet Data Serving Node (PDSN) in a CDMA2000 network, or a Mobile Management Entity (MME) in a Long Term Evolution/Service Architecture Evolution (LTE/SAE) network or any other data network component.

Many packets traverse links 111-112 and nodes 108-110 as data is exchanged between devices 101-103 and servers 104-107. These packets may represent many different sessions and protocols. For example, if device 103 is used for a voice or video call, then device 103 may exchange Voice over Internet Protocol (VoIP) or Session Initiation Protocol (SIP) data packets with SIP/VoIP server 104 using Real-Time Transport Protocol (RTP). If device 102 is used to send or retrieve email, device 102 may exchange Internet Message Access Protocol (IMAP), Post Office Protocol 3 Protocol (POP3), or Simple Mail Transfer Protocol (SMTP) messages with email server 106. If device 101 is used to down load or stream video, device 101 may use Real Time Streaming Protocol (RTSP) to establish and control media sessions with video server 105. Alternatively, the user at device 101 may access a number of websites using Hypertext Transfer Protocol (HTTP) to exchange data packets with web server 107. It will be understood that packets exchanged between devices 101-103 and servers 104-107 may conform to numerous other protocols now known or later developed. In an exemplary system, approximately one percent of the packets traversing network 100 carry control data, such as information for setting-up, managing or tearing-down calls or sessions between devices 101-103 and servers 104-107. The other ninety-nine percent of the packets carry user data, such as actual voice, video, email or information content to and from devices 101-103.

Network monitoring system 113 may be used to monitor the performance of network 100. Monitoring system 113 captures packets that are transported across links 111-112 and any other network links or connections. In one embodiment, packet capture devices are non-intrusively coupled to network links 111-112 to capture substantially all of the packets transmitted across the links. Although only two links 111-112 are shown in FIG. 1, it will be understood that in an actual network there may be dozens or hundreds of physical, logical or virtual connections and links between network nodes. In one embodiment, network monitoring system 113 is coupled to all or a high percentage of these links. In other embodiments, network monitoring system 113 may be coupled only to a portion of network 100, such as only to links associated with a particular service provider. The packet capture devices may be part of network monitoring system 113, such as a line interface card, or may be separate components that are remotely coupled to network monitoring system 113 from different locations.

Monitoring system 113 preferably comprises one or more processors running one or more software applications that collect, correlate and analyze media and signaling data packets from network 100. Monitoring system 113 may incorporate protocol analyzer, session analyzer, and/or traffic analyzer functionality that provides OSI (Open Systems Interconnection) layer 2 to layer 7 troubleshooting by characterizing IP traffic by links, nodes, applications and servers on network 100. Such functionality is provided, for example, by the Iris Analyzer toolset available from Tektronix, Inc. The packet capture devices coupling network monitoring system 113 to links 111-112 may be high-speed, high-density 10GE probes that are optimized to handle high bandwidth IP traffic, such as the GeoProbe G10 available from Tektronix, Inc. A service provider or network operator may access data from monitoring system 113 via user interface station 117 having display 118, such as the IrisView configurable software framework that provides a single, integrated platform for all applications, including feeds to customer experience management systems and operation support system (OSS) and business support system (BSS) applications, which is also available from Tektronix, Inc. Monitoring system 113 may further comprise internal or external memory 119 for storing captured data packets, user session data, call records and configuration information. Monitoring system 113 may capture and correlate the packets associated specific data sessions on links 111-112. In one embodiment, related packets can be correlated using a 5-tuple association mechanism. The 5-tuple association process uses an IP correlation key that consists of 5 parts—server IP address, client IP address, source port, destination port, and Layer 4 Protocol (TCP or UDP or SCTP). The related packets can be combined into a record for a particular flow, session or call on network 100.

As the capability of network 100 increases toward 10GE or higher, each link 111-112 supports more users' flows and sessions. In one embodiment, link 111 is a 10GE pipe supporting thousands of users. Many of the subscribers may have multiple active sessions, which results in thousands of active flows on link 111 at any time where each flow includes many packets. With such a very large volume of packets, it becomes difficult for a service provider or network operator to analyze all the traffic across network 100 and to identify problem nodes or links.

The system and method disclosed herein creates a hierarchical accumulation of flows that allows a network operator to focus on the most critical or most relevant flows. These systems and methods allow the network operator to quickly identify and address problems in network 100. Network monitoring system 113 analyzes the network data and presents it to the network operator in an actionable form that facilitates drilling down to specific packets, links, or nodes while ignoring other data that is not associated with a particular network problem.

Some or all of the packets from links in network 100 may be captured using a probe or monitor. Those packets may be processed in a multi-core processor to correlate packets into related flows using, for example, a 5-tuple association mechanism to correlate packets into session flow records for individual subscribers. Those flow records represent end-to-end packet data for a session collected from all of the links monitored by monitoring system 113. The flow records can be stored to memory 119, for example, for later analysis. If the network operator is aware of a particular subscriber—out of the thousands of network users—having a problem, then the network operator may retrieve and analyze the specific subscriber's session record. However, each session record may contain megabytes of data that would need to be reviewed to identify network problems. Analyzing network operation in this manner is time consuming and may not provide sufficient information to identify network faults.

The present invention provides a more efficient method of identifying network problems. Network monitoring system 113 creates session flow records for each subscriber and stores these records at periodic intervals, such as every fifteen minutes, to memory 119. The session flow records are then organized and grouped by session type or protocol. For example, all session records associated with an email application or server may be combined into a single group. Packets associated with a video sharing application may be combined into a second group. The sessions may be grouped using other criteria, such as the number of packets, uplink/downlink flow, intensity of activity during the interval, user or device identify, or server identity.

Operator-defined criteria are then applied to the session groups to identify actual or potential network problems. For example, in email session flow records, the network operator may define criteria that look for two-way traffic. If an email session flow record includes uplink packets that are sent by a device, but no corresponding downlink packets, then the session flow record will be flagged as failing the two-way traffic criteria. In another embodiment, quality of service (QoS) criteria may be defined for VoIP sessions. Network monitoring system 113 may analyze the RTP packets in the VoIP session flow records to determine if network 100 is using DiffServ (Differentiated Services) values properly by prioritizing the VoIP packets appropriately. DiffServ is a QoS protocol for managing bandwidth allocation for media connections. If a VoIP session record shows that a router in network 100 is not honoring the packets, then the session record will be flagged as failing the DiffServ criteria. If one of the session records in a group has been flagged as failing the operator-defined criteria, then the group is also flagged as comprising one or more flagged session record.

The groups of session flow records are further aggregated into a multi-protocol group representing each periodic interval. If one of the session flow records in an aggregated group has been flagged, then the multi-protocol group will also be flagged so that the operator can identify the occurrence of an error during the aggregation interval. The flagged sessions, groups or aggregations may be indicated visually, for example, by color-coding the records on display 118. In one embodiment, flagged records are color-coded red to indicate the occurrence of an operator-defined criteria violation and "normal" records are color-coded green. The session records with errors are passed up to the multi-user, multi-protocol level of a display to allow an operator to quickly identify the presence of a problem.

FIGS. 2A-2D illustrate an exemplary user interface display 200a according to embodiments of the invention. In the top-level display shown in FIG. 2A, a network operator is shown a high-level overview of a monitored network, including, for example, SGSN 201, GGSN 202, Router 203, and Gateway 204. Arrows 205-207 represent multi-protocol aggregation of session flow records for a selected interval. Date 208 and time 210 show the selected interval. Drop-down menu selection buttons 209 and 211 allow the operator to select other dates and time intervals for analysis. Time interval 210 may be a fifteen minute interval in one embodiment, but other any duration may be used as appropriate. The duration of the time interval selected for display and for aggregation of flow sessions may be selected based upon the size of the network and the traffic volume on the network.

Figure 2A:
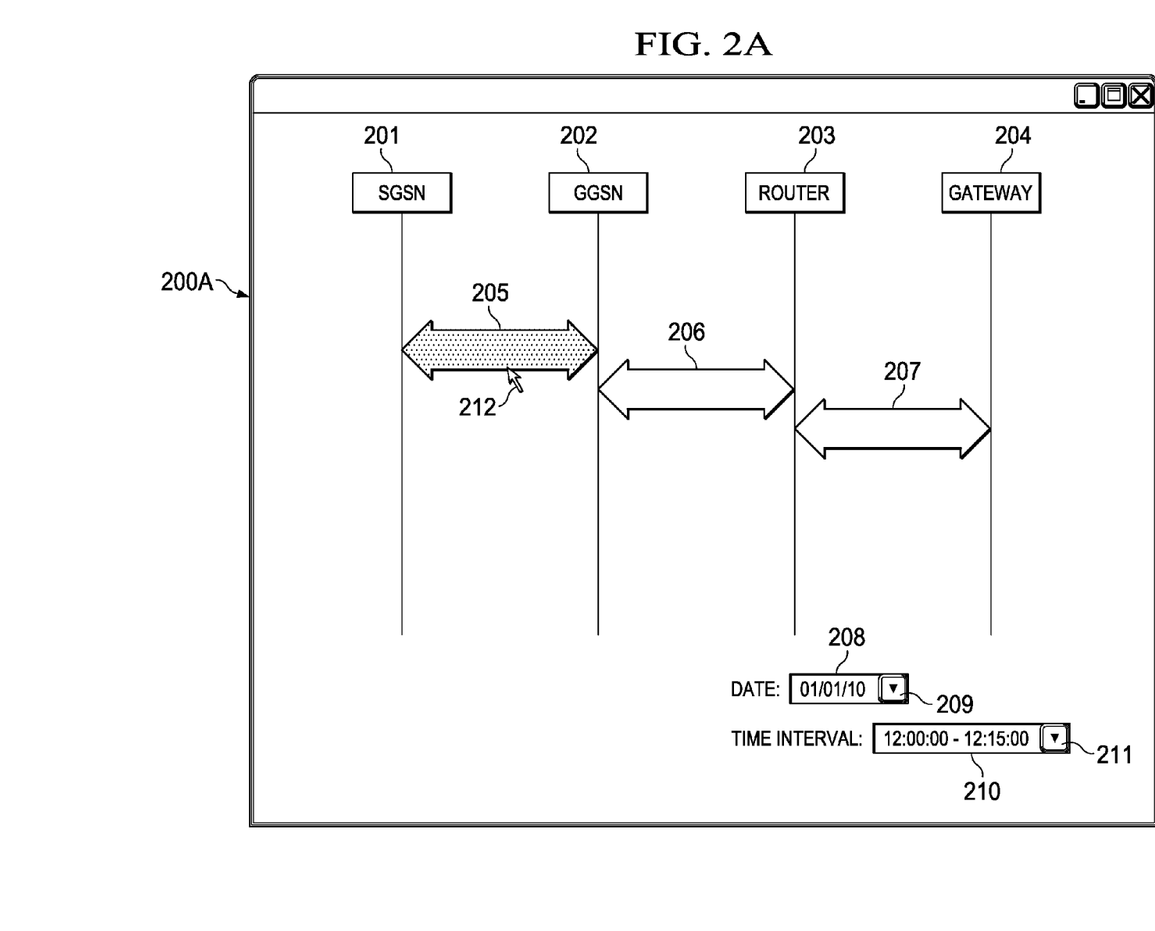
FIGS. 2A-2D illustrate screens from a user interface according to exemplary embodiments.

Arrow 205 is highlighted compared to arrows 206-207, such as by coloring arrow 205 red or yellow while coloring arrows 206-207 green or white. The highlighting indicates to the operator that one or more of the session flows in multi-protocol aggregation 205 for the selected time interval failed to meet the operator-selected criteria. The operator may obtain more detailed information regarding the error(s) in multi-protocol flow 205 by selecting or "clicking" on arrow 205 using cursor 212.

Figure 2B:
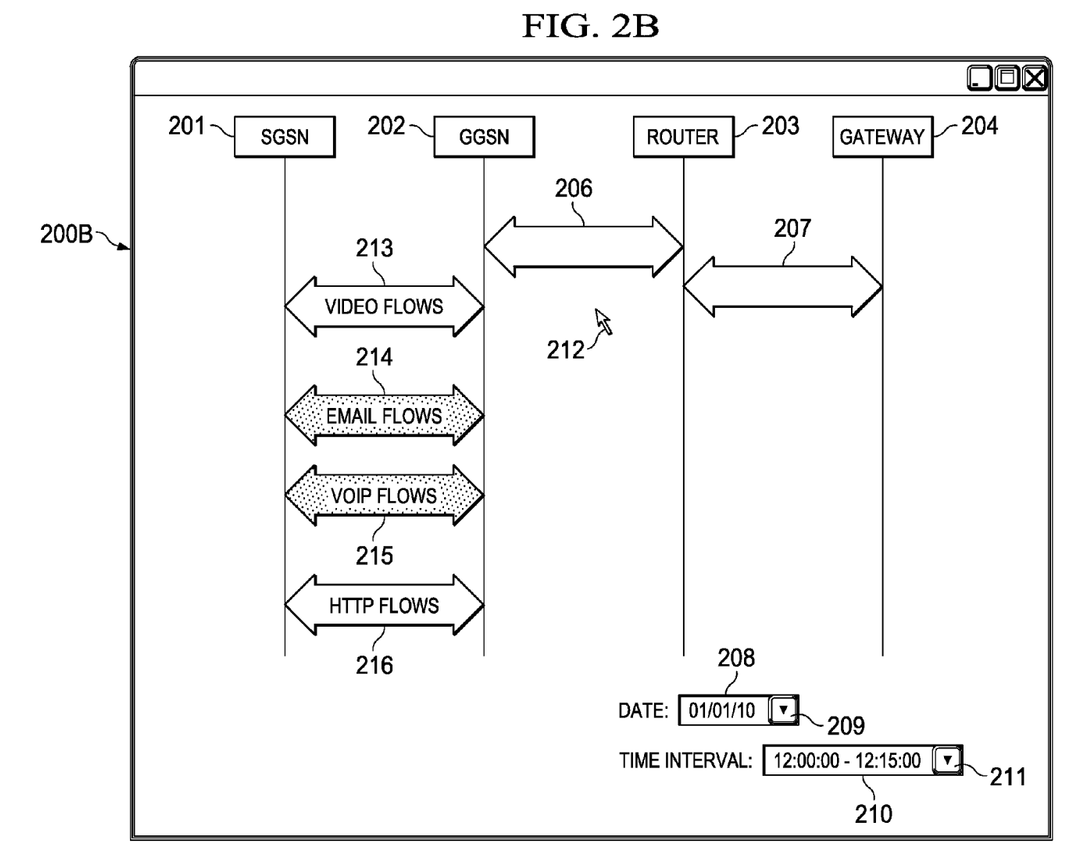

FIG. 2B illustrates user interface display 200b, which is displayed after selecting flow 205 in display 200a (FIG. 2A). Arrows 213-216 represent aggregated flows for specific protocols within multi-protocol flows 205. Arrow 213 represents all video session flows captured during the selected time interval. Arrow 213 may include, for example, all session records associated with RTSP packets. Arrow 214 represents all email flows captured during the selected interval. Arrow 214 may include, for example, all session records associated with IMAP, POP3 or SMTP packets. Arrow 215 represents all VoIP session flows captured during the selected interval. Arrow 215 may include, for example, all session records associated with RTP packets. Arrow 216 represents all HTTP flows captured during the selected interval, such as all HTTP packets used to browse web sites.

Arrows 214 and 215 are highlighted, such as by coloring the arrows red or yellow, indicating that one or more of the session flows in aggregated email flows 214 and in aggregated VoIP flows 215 failed to meet the operator-selected criteria. Arrows 213 and 216 are not highlighted, such as being colored white or green, to indicate that no operator-defined criteria for video or web browsing sessions were violated during the selected interval. The criteria failure indicated in highlighted arrows 214 and 215 are passed up to the top-level display 200a (FIG. 2A) and result in arrow 205 being highlighted. If no criteria were violated in aggregate session flows 213-216 during the selected interval, then each of the arrows 213-216 would be colored a "normal" color, such as green or white. The operator may "drill down" further to more specifically determine the source of the failure and to identify the problem.

Figure 2C:
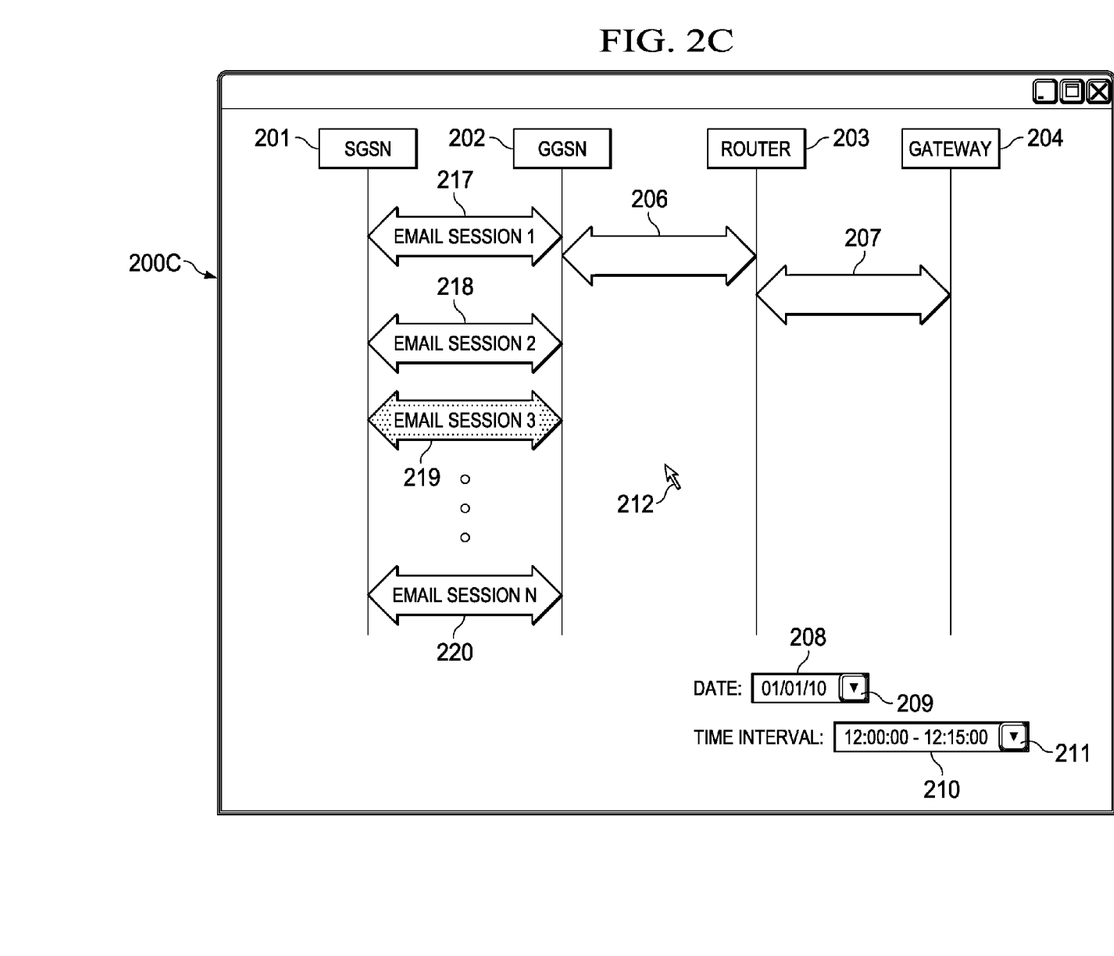

FIG. 2C illustrates user interface display 200c, which is displayed after selecting aggregated email flow 214 in display 200b (FIG. 2B). Arrows 217-220 represent flows for specific email sessions within aggregated email flow 214. Arrows 217-220 each represent an individual email session flows captured during the selected time interval. Individually, arrows 217-220 may each represent, for example, an email session records associated with a particular device. Arrow 219 is highlighted indicating that the session flows for the associated device failed to meet the operator-selected criteria for email sessions.

Figure 2D:
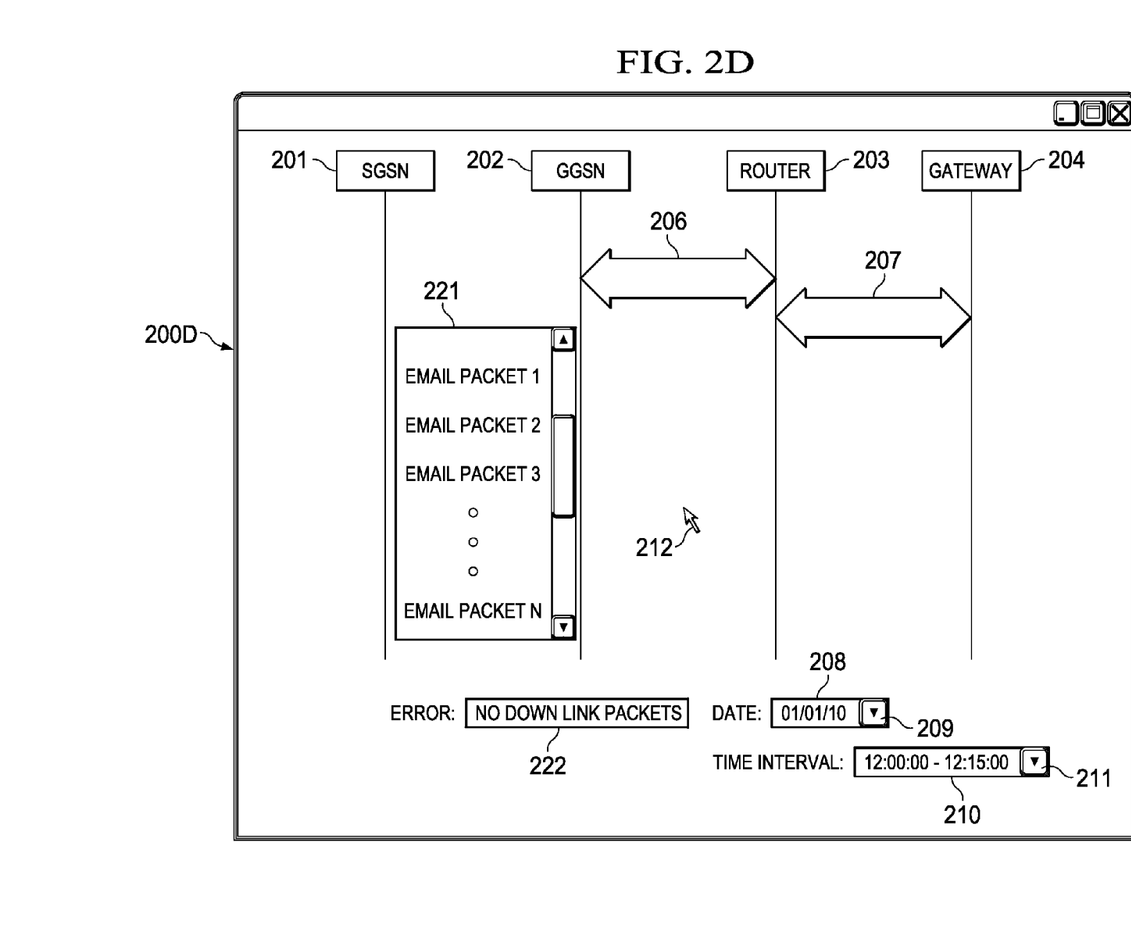

FIG. 2D illustrates user interface display 200d, which is displayed after selecting flow 219 in display 200c (FIG. 2C). List 221 includes all of the packets captured from the network during the selected interval that are associated with a specific device. These packets may have been correlated by the network monitoring system as being related. The packets may be identified as associate with the same session if they have the same source and destination IP addresses, same source and destination ports and same Layer 4 protocol, for example. The network monitoring system identified a problem with this session flow that violated operator-selected criteria, which resulted in the highlighted arrows of displays 200a-200c. In one embodiment, display 200d may indicated the error 222 that was detected in this flow.

By drilling down from the top level display in FIG. 2A to a specific session flow packet list in FIG. 2D, the operator can quickly identify and analyze the relevant packets that are involved in a network problem or failure. The list of packets 221 provides the operator with an end-to-end look at the network so that the operator may identify the source of the problem. For example, in the situation illustrated in FIGS. 2A-2D, the lack of downlink packets in an email session (or attempted email session) may indicate that the destination email server, which may be external to the monitored network, is not responding to the packets. Alternatively, in analyzing the end-to-end packet list 221, the network operator may identify a network node, such as router 203 or gateway 204, that is not passing the email packets to the destination email server. The network operator may then take action to correct the problem, which may be caused, for example, by incorrect routing information in router 203 or gateway 204 or by an inoperative network node or link coupled to router 203 or gateway 204.

Embodiments of the invention all a network operator to quickly "click" into the entire packet flow for a specific session so that the operator can evaluate multiple "hops" across the entire network. The packets represent data collected across all routers, switches and links end-to-end in the network. Because the packets have been correlated and aggregated by the network monitoring system, the operator does not have to sort through the thousands of packets and megabytes of data captured during the selected interval to identify the network problem. The invention may be used with any protocol, application, or session to create a "drill-down" path for the rapid identification of network problems.

Figure 3:
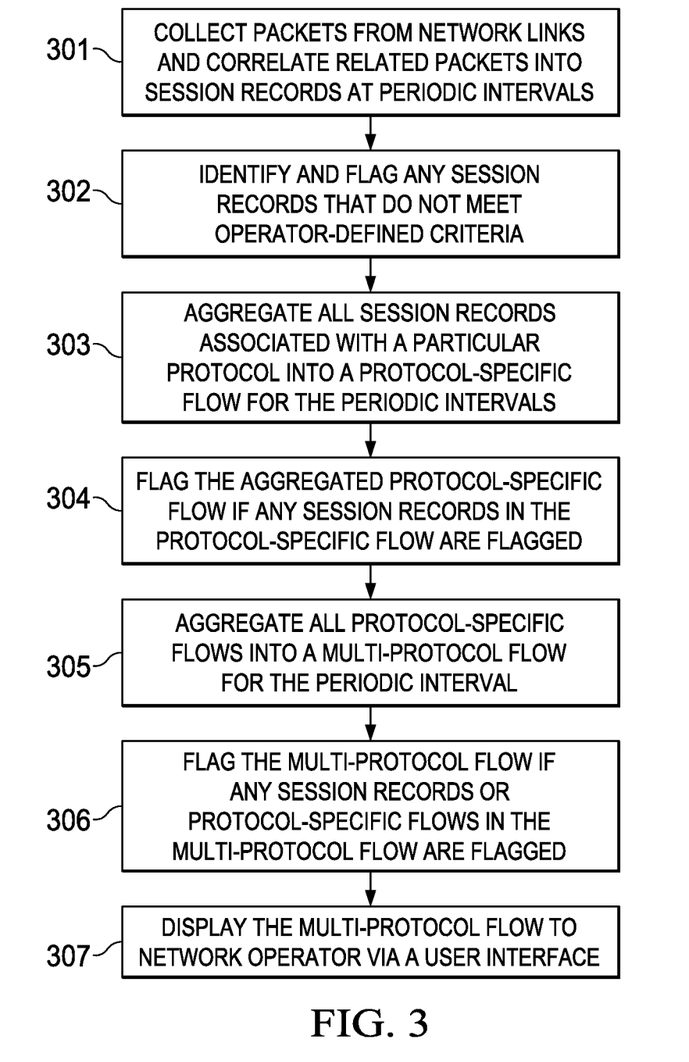
FIG. 3 is a flowchart illustrating an exemplary embodiment of a method for displaying a multi-protocol flow to a network operator.

FIG. 3 is a flowchart illustrating an exemplary embodiment of a method for displaying a multi-protocol flow to a network operator. In step 301, packets are collected from network links by a network monitoring system. Related packets are correlated into session records representing periodic time periods, such as packets captured at fifteen minute intervals. In step 302, session records that do not meet operator-defined criteria are identified and flagged for later retrieval. In step 303, all session records associated with a particular protocol during the periodic intervals are aggregated into a protocol-specific flow. In step 304, the aggregated protocol-specific flow are flagged if any session records in the protocol-specific flow are also flagged. In step 305, all protocol-specific flows are aggregated into a multi-protocol flow for the periodic interval. In step 306, the multi-protocol flow is flagged if any session records or protocol-specific flows in the multi-protocol flow are also flagged. In step 307, the multi-protocol flow is displayed to network operator via a user interface.

Figure 4:
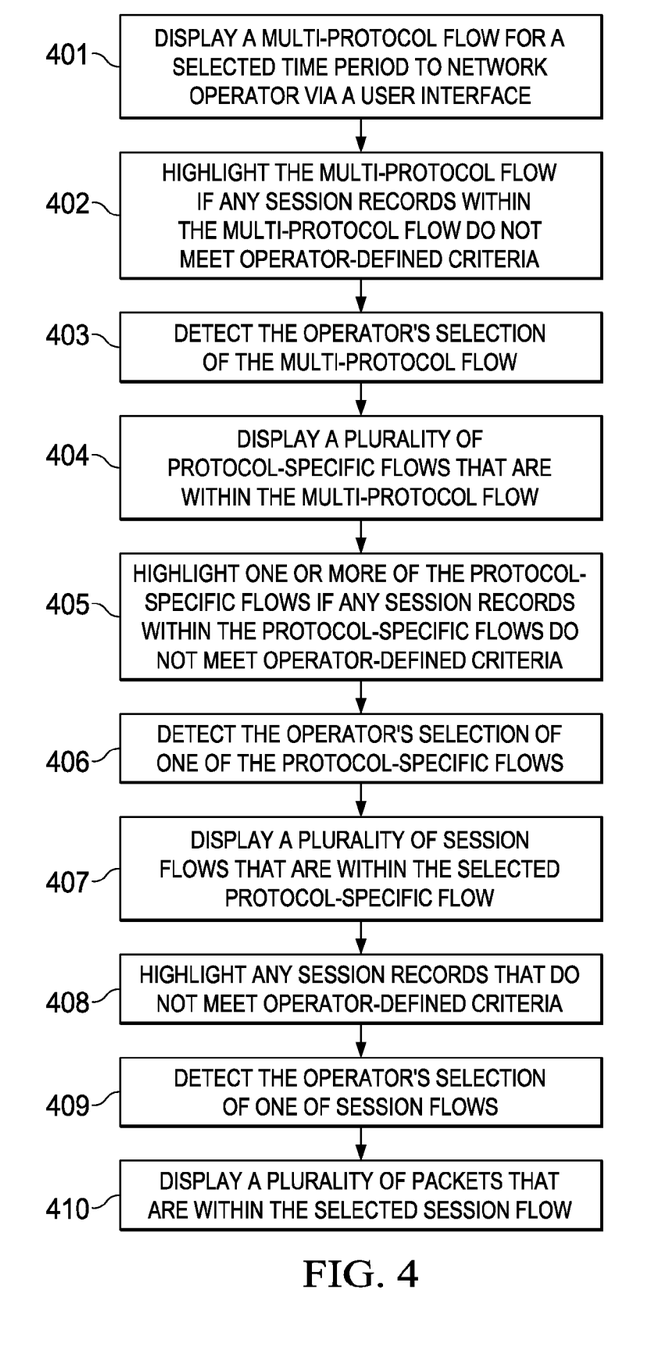
FIG. 4 is a flowchart illustrating an exemplary embodiment of a method for analyzing the operation and performance of a telecommunications network.

FIG. 4 is a flowchart illustrating an exemplary embodiment of a method for analyzing the operation and performance of a telecommunications network. In step 401, a multi-protocol flow for a selected time period is displayed to network operator via a user interface. In step 402, the multi-protocol flow is highlighted if any session records within the multi-protocol flow do not meet operator-defined criteria. In step 403, the user interface detects the operator's selection of the multi-protocol flow. The selection may be made, for example, by "clicking" on the displayed multi-protocol flow as illustrated in FIGS. 2A-2D. In step 404, the user interface displays a plurality of protocol-specific flows that are within the multi-protocol flow that was selected in step 403. In step 405, the user interface highlights one or more of the protocol-specific flows displayed in step 404, if any of the session records within the protocol-specific flows do not meet operator-defined criteria.

In step 406, the user interface detects the operator's selection of one of the protocol-specific flows displayed in step 404. In step 407, the user interface displays a plurality of session flows that are within the selected protocol-specific flow. In step 408, any session records that do not meet operator-defined criteria are highlighted on the user interface. In step 409, the user interface detects the operator's selection of one of session flows, and in step 410 displays a plurality of packets that are within the selected session flow. The packets displayed in step 410 allow the network operator to perform an end-to-end analysis of the session that failed the operator-selected criteria.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method for monitoring the operation of a telecommunications network, comprising:
    displaying, on a user interface of a network monitoring system, a multi-protocol flow representing packets captured from the telecommunications network during a selected time period;
    highlighting the multi-protocol flow on the user interface display if any session records within the multi-protocol flow do not meet operator-defined criteria;
    detecting a user's selection of the multi-protocol flow;
    displaying, on the user interface, a plurality of protocol-specific flows that are within the multi-protocol flow;
    highlighting one or more of the protocol-specific flows on the user interface display if any session records within the protocol-specific flows do not meet operator-defined criteria;
    detecting the user's selection of one of the protocol-specific flows;
    displaying, on the user interface, a plurality of session flows that are within the selected protocol-specific flow;
    highlighting any session records on the user interface display that do not meet operator-defined criteria;
    detecting the operator's selection of one of session flows;
    displaying, on the user interface, a plurality of packets that are within the selected session flow;
    wherein the method aggregates session flows in a hierarchical manner to identify errors in a lower layer of the hierarchy.

2. The method of claim 1, wherein the highlighting comprises assigning a color on the user interface display.

3. The method of claim 1, wherein the protocol-specific flows comprise packets associated with a protocol selected from the group consisting of: email protocols, VoIP protocols, and video streaming protocols.

4. A system for monitoring IP flows in a telecommunications network, comprising:
    a plurality of monitor probes coupled to links in the telecommunications network, the monitor probes configured to capture data packets from the links and correlating the data packets into session records;
    a processor coupled to the monitor probe, the processor configured to analyze the session records to determine if the session records meet predetermined criteria; and
    a user-interface coupled to the processor, the user interface configured to:
    display a multi-protocol flow representing packets captured from the telecommunications network during a selected time period;
    highlight the multi-protocol flow if any session records within the multi-protocol flow do not meet operator-defined criteria;
    detect a user's selection of the multi-protocol flow;
    display a plurality of protocol-specific flows that are within the multi-protocol flow;
    highlight one or more of the protocol-specific flows if any session records within the protocol-specific flows do not meet operator-defined criteria;
    detect the user's selection of one of the protocol-specific flows;
    display a plurality of session flows that are within the selected protocol-specific flow;
    highlight any session records that do not meet operator-defined criteria; detect the operator's selection of one of session flows;
    display a plurality of packets that are within the selected session flow;
    wherein the system aggregates session flows in a hierarchical manner to identify errors in a lower layer of the hierarchy.

5. A non transitory computer program product that includes a non-transitory computer readable medium useable by a computer system, the medium having stored thereon a sequence of instructions which, when executed by a computer system, causes the computer system to:
    display, on a user interface, a multi-protocol flow representing packets captured from the telecommunications network during a selected time period;

highlight the multi-protocol flow on the user interface display if any session records within the multi-protocol flow do not meet operator-defined criteria;

detect a user's selection of the multi-protocol flow;

display, on the user interface, a plurality of protocol-specific flows that are within the multi-protocol flow;

highlight one or more of the protocol-specific flows on the user interface display if any session records within the protocol-specific flows do not meet operator-defined criteria;

detect the user's selection of one of the protocol-specific flows;

display, on the user interface, a plurality of session flows that are within the selected protocol-specific flow;

highlight any session records on the user interface display that do not meet operator-defined criteria;

detect the operator's selection of one of session flows;

display, on the user interface, a plurality of packets that are within the selected session flow;

wherein the computer program aggregates session flows in a hierarchical manner to identify errors in a lower layer of the hierarchy.

\* \* \* \* \*